United States Patent
Chen et al.

(10) Patent No.: US 9,431,821 B2
(45) Date of Patent: Aug. 30, 2016

(54) ELECTRONIC DEVICE

(71) Applicants: Jian Chen, Shanghai (CN); Changyin Wang, Changzhou (CN); Jingsong Zhong, Kunshan (CN)

(72) Inventors: Jian Chen, Shanghai (CN); Changyin Wang, Changzhou (CN); Jingsong Zhong, Kunshan (CN)

(73) Assignee: Sensata Technologies, Inc., Attleboro, MA (US)

( * ) Notice: Subject to any disclaimer, the term of this patent is extended or adjusted under 35 U.S.C. 154(b) by 81 days.

(21) Appl. No.: 13/916,788

(22) Filed: Jun. 13, 2013

(65) Prior Publication Data
US 2013/0335874 A1 Dec. 19, 2013

(30) Foreign Application Priority Data
Jun. 14, 2012 (CN) .......................... 2012 2 0281068

(51) Int. Cl.
*H02H 5/04* (2006.01)
*H02H 9/02* (2006.01)
*H01C 1/014* (2006.01)
*H01C 1/022* (2006.01)

(52) U.S. Cl.
CPC .............. *H02H 9/026* (2013.01); *H01C 1/014* (2013.01); *H01C 1/022* (2013.01); *Y10T 29/49204* (2015.01)

(58) Field of Classification Search
CPC ....... H02H 9/026; H01C 1/014; H01C 1/022

USPC .......................................................... 361/106
See application file for complete search history.

(56) References Cited

U.S. PATENT DOCUMENTS

| | | | | | |
|---|---|---|---|---|---|
| 5,760,676 | A | * | 6/1998 | Yamada | 338/22 R |
| 5,963,125 | A | * | 10/1999 | Mochida et al. | 338/234 |
| 6,160,473 | A | * | 12/2000 | Gruhn | 338/22 R |
| 6,172,593 | B1 | * | 1/2001 | Mochida et al. | 338/22 R |
| 6,236,550 | B1 | * | 5/2001 | Mochida et al. | 361/106 |
| 7,245,198 | B2 | * | 7/2007 | Ozawa | 338/22 R |
| 8,174,354 | B2 | * | 5/2012 | Cohen et al. | 338/22 R |

* cited by examiner

*Primary Examiner* — Thienvu Tran
*Assistant Examiner* — Lucy Thomas
(74) *Attorney, Agent, or Firm* — Chapin IP Law, LLC

(57) ABSTRACT

The present disclosure presents an electronic device includes: an electronic element with a first electrode and a second electrode disposed on the opposite sides thereof; a first terminal and a second terminal; a first support mounted to and electrically connected with the first terminal, the first support comprising a first contact part contacting and electrically connected with the first electrode; a second support mounted to and electrically connected with the second terminal, the second support comprising a second contact part contacting and electrically connected with the second electrode; a third elastic support comprising a third contact part contacting with one of the first electrode and the second electrode, wherein the third elastic support is provided so as to push the electronic element out of contact with one of the first support and the second support when the electronic element breaks in a failure state.

19 Claims, 5 Drawing Sheets

ELECTRONIC DEVICE

TECHNICAL FIELD

The present invention relates to an electronic device, in particular, to a positive temperature coefficient (PTC) thermistor device.

BACKGROUND

Thermistor device has been widely used in current limiting circuit, including motor starting circuit in a refrigeration device such as a refrigerator. After being used for long time, the physical structure of the prior art PTC device may deteriorate, creating abnormal heat inside the device and breaking the PTC element into fragments. Since the fragments may still be connected with the terminal, issues such as arc discharging, overheating, over current, etc. may occur.

U.S. Pat. No. 6,172,593 assigned to Murata Manufacturing Co., Ltd. Introduces an electronic device with two spring contact parts and two non-conductive contact parts. During operation period, the four contact parts contact with PTC, and the two spring contact parts are welded to the left and right terminals respectively. On one hand, the material closely contact with PTC (non-conductive contact parts) need to be resistant to high temperature and thus is relative expensive. On the other hand, in the case that PTC is broken without disconnecting current, the fragment of PTC still electrically connected with the terminals, creating arc discharging and over-heating.

CN patent application CN102347123 filed by Sensata Technologies Massachusetts, Inc. introduces a thermistor device with three elastic support and a pair of insulated offset posts, wherein two elastic support is welded to a terminal and a third elastic support is welded to another terminal. Said pair of offset posts are spaced from the thermistor element. Since the posts do not contact with the PTC element, it does not need expensive material resistant to high-temperature. However, in the case that the thermistor is broken without disconnecting current, the fragment of the thermistor still electrically connected with the terminals, creating arc discharging and overheating.

Thus, current thermistor device may not be able to reliably eliminate the issues of arc discharging and overheating in a failure broken state.

SUMMARY

It is an object of the present disclosure to provide an electronic device, in the case that an electronic element such as a thermistor element is broken, the circuit can be securely disconnected, so as to eliminate the issues such as arc discharging and overheating.

The present disclosure presents an electronic device includes: an electronic element with a first electrode and a second electrode disposed on the opposite sides thereof; a first terminal and a second terminal; a first support mounted to and electrically connected with the first terminal, the first support comprising a first contact part contacting and electrically connected with the first electrode; a second support mounted to and electrically connected with the second terminal, the second support comprising a second contact part contacting and electrically connected with the second electrode; a third elastic support comprising a third contact part contacting with one of the first electrode and the second electrode, wherein the third elastic support is provided so as to push the electronic element out of contact with one of the first support and the second support when the electronic element breaks in a failure state.

According to the present electronic device, in the case that the electronic element broken, the elastic force of the third elastic support pushes the fragments of the electronic element away so that the fragments do not contact with one of the first support and the second support, disconnecting the electronic element with one of the terminals, disconnecting the circuit and eliminating the issues of arc discharging and overheating.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DETAILED DESCRIPTION

First Embodiment

Figure 1:
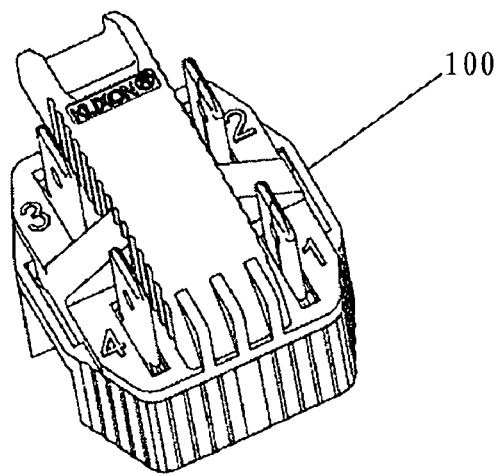
FIG. 1 is a perspective view of a PTC thermistor device according to one embodiment of the present invention in an assembled status.
Figure 2:
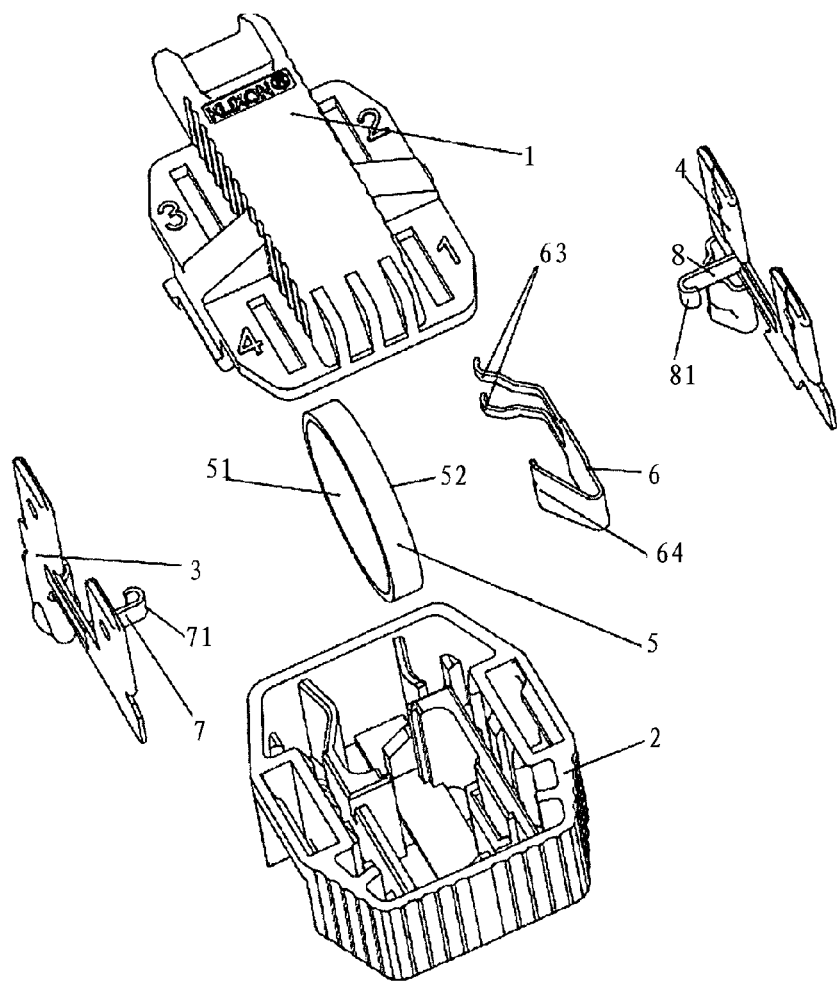
FIG. 2 is a perspective view of the PTC thermistor device in an exploded status.

FIG. 1 is a perspective view of an electronic device 100 such as a PTC thermistor device according to one embodiment of the present invention in an assembled status. FIG. 2 is a perspective view of the PTC thermistor device in an exploded status.

As shown in FIG. 2, the electronic device 100 includes a cover 1, a base 2, a first terminal 3, a second terminal 4 and an electronic element 5. The electronic element 5 is such as a PTC disc. The electronic element has a first electrode 51 and a second electrode 52 disposed on the opposite sides thereof.

The electronic device 100 further includes a first support 7 with a first contact part 71 contacting and electrically connecting with the first electrode 51; and a second support 8 with a second contact port 81 contacting and electrically connecting with the second electrode 52. The first support 7 is mounted on the first terminal 3 and electrically connected therewith. The second support 8 is mounted on the second terminal 4 and is electrically connected therewith. Preferably, the first support 7 is integral with the first terminal 3. Preferably, the second support 8 is integral with the second terminal 4. The second support 8 is a rigid support. Preferably, the first support 7 is a rigid support. Alternatively, the first 7 could be an elastic support.

The electronic device 100 further includes a third elastic support 6. The third support 6 is such as a spring. The third support 6 has a third contact part 63 contacting with the second electrode 52 at a position close to the second contact part 81. Preferably, the third contact part 63 is spaced from the second contact part 81. Alternatively, the third contact part 63 may contact with or overlap with the second contact part 81.

The third support 6 preferably includes a first elastic part and a second elastic part 62. The first elastic part 61 provides said third contact part 63. The second elastic part 62 includes a fourth contact part 64. The fourth contact part 64 contacts the second electrode 52 at a position different from the second contact part 81 and the third contact part 63.

Figure 3:
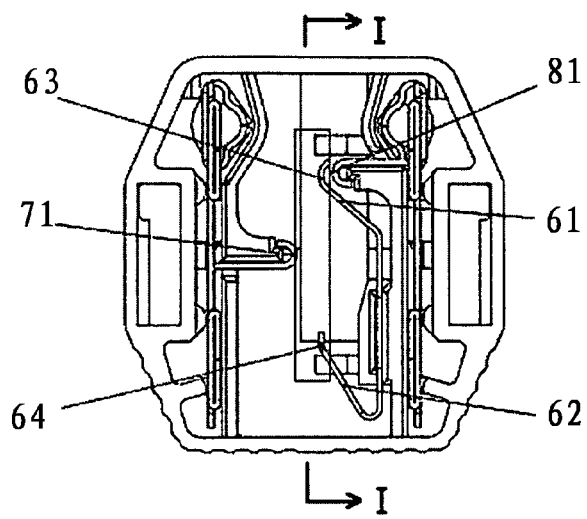
FIG. 3 is a top view of the PTC thermistor device with a cover removed.

FIG. 3 is a top view of the PTC thermistor device with the cover removed. As shown in FIG. 3, the first contact part 71 is closer to the center of the electronic element 5 than the second contact part 81 and the fourth contact part 64, and the second contact part 81 and the fourth contact part 64 is opposite to each other across the first contact part 71. Preferably, the first contact part 71 is positioned on the center of the electronic element 5 and a line connecting the second contact part 81 and the fourth contact part 64 passes the center of the electronic device. In other word, the second contact part 81 and fourth contact part 64 is positioned on two radial sides of the first contact part 71. The first contact part 71 abuts the first electrode 51 of the electronic element 5 at a general center position. The second contact part abuts the second electrode 52 of the electronic element 5. The first elastic part 61 applies an elastic force on the electronic element 5 via the third contact part 63. The second elastic part 62 applies an elastic force on the electronic element 5 via the fourth contact part 64. Thus, the first support 7 and the second support 8 apply a force toward the electronic element 5 against the elastic force of the first elastic part 61 and the second elastic part 62, so that closer contact may be formed between the first contact part 71 and the first electrode 51, and the second contact part 81 and the second electrode 52. In this way the electronic element 5 forms a more reliable connection with the first terminal 3 and the second terminal 4.

One skilled in the art understands that the elastic force applied on the electronic element by the second elastic part 61 need to be larger than that applied on the electronic element by the first elastic part 61, so that the first support 7 and the second support 8 can apply a force toward the electronic element 5 to realize a close contact.

Figure 5:
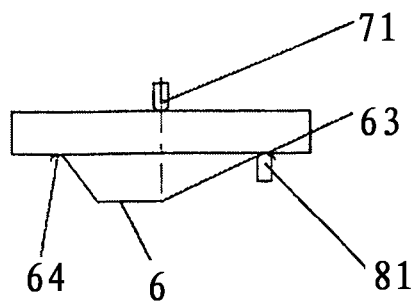
FIG. 5 shows the position relationship between the electronic element and the supports in a normal operation status.

FIG. 5 shows in a normal operation status, the first support 7 (the first contact part 71), the second support 8 (the second contact part 81), the first elastic part 61 (the third contact part 63), the second elastic part 62 (the fourth contact part 64) apply a force on the electronic element 5 respectively. The force applied by the first support 7 usually is larger than that applied by the second support 8. In a failure status, the force applied by the first support 7 close to the center of the electronic element 5 increase the possibility that the plane passing the center breaks.

Figure 6:
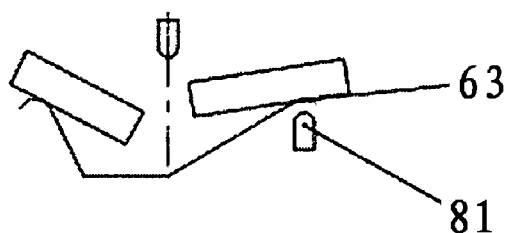
FIG. 6 shows the position relationship between the electronic element and the supports in a failure status.

FIG. 6 shows in a failure status, the electronic element 5 breaks along a plane passing near the center. The elastic force of the first elastic part 61 with the third contact part 63 drives the fragments of the electronic element 5 away from the second contact part 81, separating the fragments from the second contact part 81. That is, the second support 8 is out of contact with the second electrode. Since the second support 8 is a rigid support without any compression, when the first elastic part 61 pushes away the fragments, the second support 8 does not contact with the electronic element 5 anymore. In the failure status, the third elastic support 6 is insulated with the second support 8 and the second terminal 4. For instance, the third elastic support 6 is made of an insulated material. Alternatively, in the case that the third support 6 is conductive, the third support 6 is spaced from the second support 8 and the second terminal 4 or is spaced via insulated material. Thus the electrical connection between the electronic element 5 and the second terminal 4 is cut, the fragments are disconnected from the circuit and the short cut is prevented.

Figure 4:
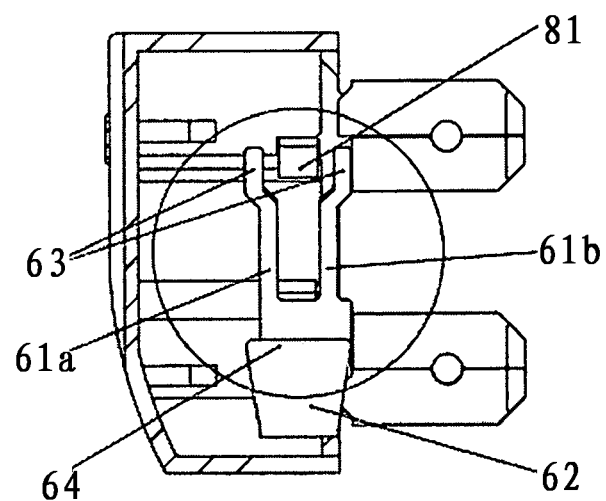
FIG. 4 is a sectional view cut along I-I in FIG. 3, wherein the electronic element is illustrated in a transparent manner.

In a preferred manner, the first elastic part 61 may includes two elastic forks 61a, 61b with two third contact parts 63 contacting the second electrode 52. As shown in FIG. 4, the second contact part 81 is positioned between the two third contact parts 63 and spaced therewith. In a direction crossing a line connecting the second contact part 81 and the fourth contact part 64, the second contact part 81 and the third contact parts 63 are spaced. Preferably, in a direction generally perpendicular to a line connecting the second contact part 81 and the fourth contact part 64, the second contact part 81 is spaced from the third contact parts 63. In a PTC device in a refrigerant starter, the spaced distance between the second contact part 81 and the third contact part 63 usually less than about 2 mm but is not limited to that value. The elastic force applied on the electronic element 5 by the second elastic part 62 is larger than the sum of the that applied by the two elastic forks 61a, 61b. In a normal operation status, the first support 7 and the second support 8 apply force toward the electronic element 6 to realize close contact. In a failure status, the two elastic forks 61a, 61b push the fragments of the electronic element 5 way from the second contact part 81, so that the second support 8 is out of contact with the second electrode 52 and the fragments is disconnected from the circuit.

One skilled in the art understands that the first elastic part 61 is not limited to including two elastic forks 61a, 61b, but could includes other numbers of forks, as long as the balance of the electronic device 100 can be maintained and the fragments can be pushed away from the second contact part in a failure status.

Second Embodiment

Figure 7:
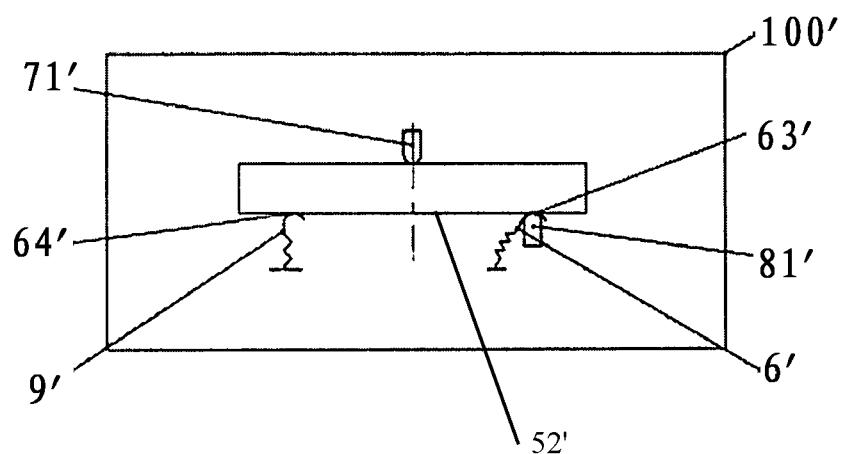
FIG. 7 shows a PTC thermistor device according to another embodiment of the present invention.

FIG. 7 shows a PTC thermistor device 100' according to the second embodiment of the present invention. Except for the third elastic support 6', other parts are substantially identical with those in the first embodiment and thus the description thereof is omitted.

The electronic device 100' includes a third elastic support 6' and a fourth elastic support 9'. The third elastic support 6' includes a third contact part 63' contacting the second electrode 52' at a position near to the second contact part 81'. Preferably, the third contact part 63' is spaced from the second contact part 81'. Alternatively, the third contact part 63' may contact or overlap with the second contact part 81'.

The fourth elastic support 9' include a fourth contact part 64' contacting the second electrode 52' at a position different from the second contact part 81' and the third contact part 63'.

The first contact part 71' is closer to the center of the electronic element 5' than the second contact part 81' and the fourth contact part 64', and the second contact part 81' and the fourth contact part 64' are opposite to each other across the first contact part 71'. Preferably, said first contact part 71' is position is on the center of the electronic element 5' while a line connecting the second contact part 81' and the fourth contact part 64' passes the center of the electronic element 5'. The first contact part 71' abuts the general center of the first electrode 51' of the electronic element 5' and the second contact part 81' abuts the side of the second electrode 52' of the electronic element 5'. The third elastic support 6' applies an elastic force on the electronic element 5' via the third contact part 63'. The fourth elastic support 9' applies an elastic force on the electronic element 5' via the fourth contact part 64'. Thus the first support 7' and the second support 8' create a force toward the electronic element 5' against the elastic force of the third support 6' and the fourth support 9', so that closer contact is formed between the first contact part 71' and the first electrode 51', and the second contact part 81' and the second electrode 52'. In this way reliable connection is formed between the electronic element 5' and the first terminal 3' and the second terminal 4'.

One skilled in the art understands that the elastic force applied on the electronic element by the fourth support 9' need to be larger than that applied on the electronic element by the third support 6', so that the first support 7' and the second support 8' can apply a force toward the electronic element 5' to realize a close contact.

In a failure status, the electronic element 5' breaks along a plane passing near the center. The elastic force of the third elastic part 6' with the third contact part 63' drives the fragments of the electronic element 5' away from the second contact part 81', separating the fragments from the second contact part 81'. That is, the second support 8' is out of contact with the second electrode 52'. Since the second support 8' is a rigid support without any compression, when the third elastic support 6' pushes away the fragments, the second support 8' does not contact with the electronic element 5' anymore. In the failure status, the third elastic support 6' and the fourth support 9' are insulated with the second support 8' and the second terminal 4'. For instance, the third elastic support 6' and the fourth elastic support 9' may be made of an insulated material. Alternatively, in the case that the third elastic support 6' and the fourth elastic support 9' are conductive, the third elastic support 6' and the fourth elastic support 9' may be spaced from the second support 8' and the second terminal 4' or are spaced via insulated material. Thus the electrical connection between the electronic element 5' and the second terminal 4' is cut, the fragments are disconnected from the circuit and the short cut is prevented.

One skilled in the art understands that the third elastic support 6' may include two or other numbers of forks and the description thereof is omitted.

Third Embodiment

Figure 8:
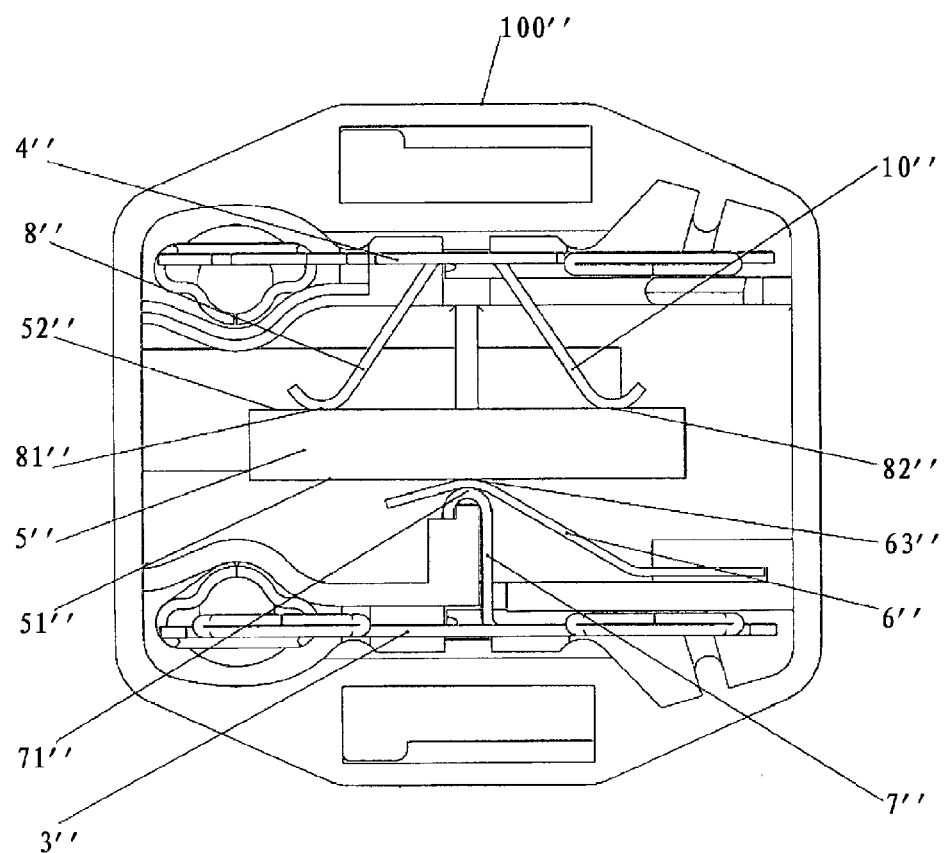
FIG. 8 shows a PTC thermistor device according to a further embodiment of the present invention.

FIG. 8 shows a PTC thermistor device according to a third embodiment of the present invention.

The electronic device 100" includes a first support 7" with a first contact part 71" contacting and electrically connecting with the first electrode 51"; a second support 8" with a second contact part 81" contacting and electrically connecting with the second electrode 52"; and a fifth support 10" with a fifth contact part 82" contacting and electrically connecting with the second electrode 52" at a position different from the second contact part 81". The first support 7" is mounted on the first terminal 3" and electrically connected therewith. The second support 8" and the fifth support 10" are mounted on the second terminal 4" and electrically connected therewith. Preferably, the second support 8" may be integral with the fifth support 10". Preferably, the second support 8" and the fifth support 10" may be integral with the second terminal 4". Preferably, the first support 7" may be integral with the first terminal 3". Preferably, the first support 7" is a rigid support. Preferably, the second support 8" and the fifth support 10" are elastic support.

The electronic device 100" further comprises a third elastic support 6". The third elastic support 6" is such as a spring. The third elastic support has a third contact part 63" contacting the first electrode 51" at a position near to the first contact part 71". Preferably, the third contact part 63" is spaced from the first contact part 71". Alternatively, the third contact part 63" may be contact or overlap with the first contact part 71".

Similar as the first embodiment, the third elastic support 6" may include two or other numbers of forks. The first contact part 71" is positioned between the two elastic forks and spaced therefrom. Preferably, the spaced distance between the first contact part 71" and the two forks is less than 2 mm.

The first contact part 71" is closer to the center of the electronic element 5" than the second contact part 81" and the fifth contact part 82", and the second contact part 81" and the fifth contact part 82" are opposite to each other across the first contact part 71". Preferably, said first contact part 71" is position is on the center of the electronic element 5' while a line connecting the second contact part 81" and the fifth contact part 82" passes the center of the electronic element 5".

The elastic second support 8" applies a second elastic force on the electronic element. The elastic fifth support 10" applies a fourth elastic force on the electronic element. The third elastic support 6" applies a first elastic force on the electronic element. The sum of the second elastic force and the fifth elastic force is greater than the first elastic force. Thus, in a normal operation status, the first support 7" creates a force toward the first electrode 51" due to the first elastic force, the second elastic force and the fifth elastic force, so that the first support 7" and the first electrode 51" keep close contact.

Figure 9:
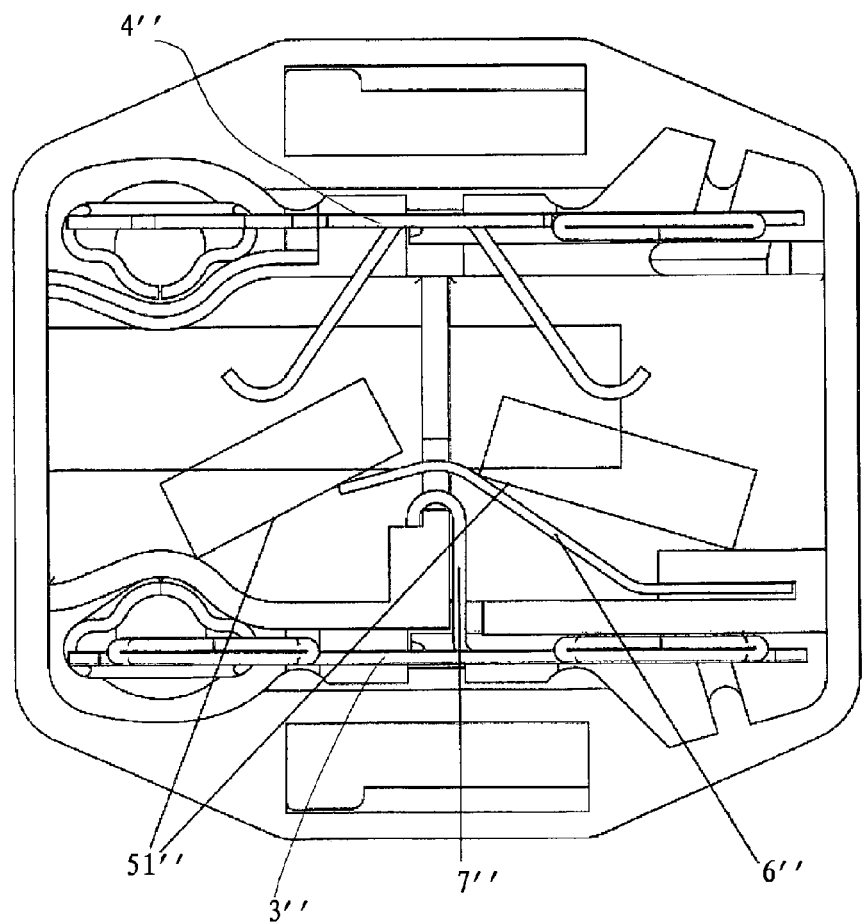
FIG. 9 shows the position relationship between the electronic element and the supports in a failure status of electric device of FIG. 8.

In a failure status when the electronic element breaks, the first elastic force drives the fragments of the electronic element away from the first support 7", causing the first support 7" out of contact with the first electrode 51", as shown in FIG. 9. Since the first support 7" is a rigid support without any compression, when the third elastic support 6" pushes away the fragments, the first support 7" does not contact with the electronic element 5" anymore. In the failure status, the third elastic support 6" is insulated with the first support 7" and the first terminal 3". For instance, the third elastic support 6" may be made of an insulated material. Alternatively, in the case that the third elastic support 6" is conductive, the third elastic support 6" may be spaced from the first support 7" and the first terminal 3" or are spaced via insulated material. Thus the electrical connection between the electronic element 5" and the first terminal 3" is cut, the fragments are disconnected from the circuit and the short cut is prevented.

In the preceding specification, various preferred embodiments have been described with reference to the accompanying drawings. It will, however, be evident that various other modifications and changes may be made thereto, and additional embodiments may be implemented, without departing from the broader scope of the invention as set fourth in the claims that follow. The specification and drawings are accordingly to be regarded in an illustrative rather than restrictive sense.

Other embodiments of the disclosure will be apparent to those skilled in the art from consideration of the specification and practice of the disclosure disclosed herein. It is intended that the specification and examples be considered as exemplary only, with the true scope and spirit of the invention being indicated by the following claims.

We claim:

1. An electronic device, comprising:
   an electronic element with a first electrode and a second electrode disposed on the opposite sides thereof;
   a first terminal and a second terminal;
   a first support mounted to and electrically connected with the first terminal, the first support comprising a first contact part contacting and electrically connected with the first electrode;
   a second support mounted to and electrically connected with the second terminal, the second support comprising a second contact part contacting and electrically connected with the second electrode; and
   a third support, the third support being an elastic support and comprising a third contact part,
   wherein, prior to breakage of the electronic element in a failure state, the third contact part contacts with the second electrode at a position substantially in contact with or overlapping the second contact part of the second support, and
   wherein, upon the breakage of the electronic element in the failure state, the third contact part of the third support is provided so as to push the electronic element away from the second support, thereby at least separating the second contact part of the second support from the second electrode of the electronic element.

2. The electronic device according to claim 1, wherein the third support is electrically insulated with the second support as well as the terminal electrically connected therewith, when the electronic element breaks in the failure state.

3. The electronic device according to claim 2, wherein the second support is a rigid support.

4. The electronic device according to claim 3, wherein the third support comprises a first elastic part including the third contact part and a second elastic part including a fourth contact part contacting with the second electrode at a different position from that of the second contact part and the third contact part.

5. The electronic device according to claim 4, wherein the first contact part is closer to a center of the electronic element than the second contact part and the fourth contact part, and the second contact part and the fourth contact part are opposite to each other across the first contact part.

6. The electronic device according to claim 5, wherein the first elastic part applies a first elastic force on the electronic element, wherein the second elastic part applies a second elastic force on the electronic element, and wherein the second elastic force is greater than the first elastic force.

7. The electronic device according to claim 6, wherein fragments of the electronic element are pushed away from the second support by the first elastic force when the electronic element breaks in the failure state, so that the second support is out of contact with the second electrode.

8. The electronic device according to claim 6, wherein, prior to the breakage of the electronic element in the failure state, the first support applies a force toward the first electrode and the second support applies a force toward the second electrode due to the first elastic force and the second elastic force, so that the first support keeps close contact with the first electrode and the second support keeps close contact with the second electrode.

9. The electronic device according to claim 4, wherein the first elastic part comprises two elastic forks, the second contact part is positioned between the two forks and spaced therewith.

10. The electronic device according to claim 9, wherein an elastic force on the electronic element applied by the second elastic part is greater than the sum of the elastic force on the electronic element applied by the two forks.

11. The electronic device according to claim 10, wherein the second contact part is spaced from the two forks in a direction crossing a line connecting the second contact part with the fourth contact part.

12. The electronic device according to claim 11, wherein the spaced distance between the second contact part and the two forks is less than 2 mm.

13. The electronic device according to claim 4, wherein the first contact part is positioned at a center of the electronic element, and a line connecting the second contact part and the fourth contact part passes the center of the electronic element.

14. The electronic device according to claim 1, wherein the electronic element is a positive temperature coefficient (PTC) disc.

15. The electronic device according to claim 1, wherein the first support is integral with the first terminal.

16. The electronic device according to claim 1, wherein the second support is integral with the second terminal.

17. A method of fabricating an electronic device, the method comprising:
   selecting an electronic device that comprises:
      an electronic element with a first electrode and a second electrode disposed on the opposite sides thereof;
      a first terminal and a second terminal;
      a first support mounted to and electrically connected with the first terminal, the first support comprising a first contact part contacting and electrically connected with the first electrode;
      a second support mounted to and electrically connected with the second terminal, the second support comprising a second contact part contacting and electrically connected with the second electrode; and
      a third support, the third support being an elastic support and comprising a third contact part contacting, prior to breakage of the electronic element in a failure state, with the second electrode at a position substantially in contact with or overlapping the second contact part of the second support, wherein, upon the breakage of the electronic element in the failure state, the third contact part of the third support is provided so as to push the electronic element away from the second support, thereby at least separating the second contact part of the second support from the second electrode of the electronic element; and
   disposing the electronic device within a cover and a base.

18. A system comprising a positive temperature coefficient (PTC) thermistor device, the system comprising:
   a current limiting circuit that comprises an electronic device that comprises an electronic element with a first electrode and a second electrode disposed on the opposite sides thereof;
   a first terminal and a second terminal;

a first support mounted to and electrically connected with the first terminal, the first support comprising a first contact part contacting and electrically connected with the first electrode;

a second support mounted to and electrically connected with the second terminal, the second support comprising a second contact part contacting and electrically connected with the second electrode;

a third support, the third support being an elastic support and comprising a third contact part, wherein, prior to breakage of the electronic element in a failure state, the third contact part contacts with the second electrode at a position substantially in contact with or overlapping the second contact part of the second support, and wherein, upon the breakage of the electronic element in the failure state, the third contact part of the third support is provided so as to push the electronic element away from the second support, thereby at least separating the second contact part of the second support from the second electrode of the electronic element.

19. The system as in claim 18, wherein the current limiting circuit is disposed within a motor starting circuit.

* * * * *